H. C. FAY.
Clock and Watch Escapement.
No. 20,201.
Patented May 11, 1858.
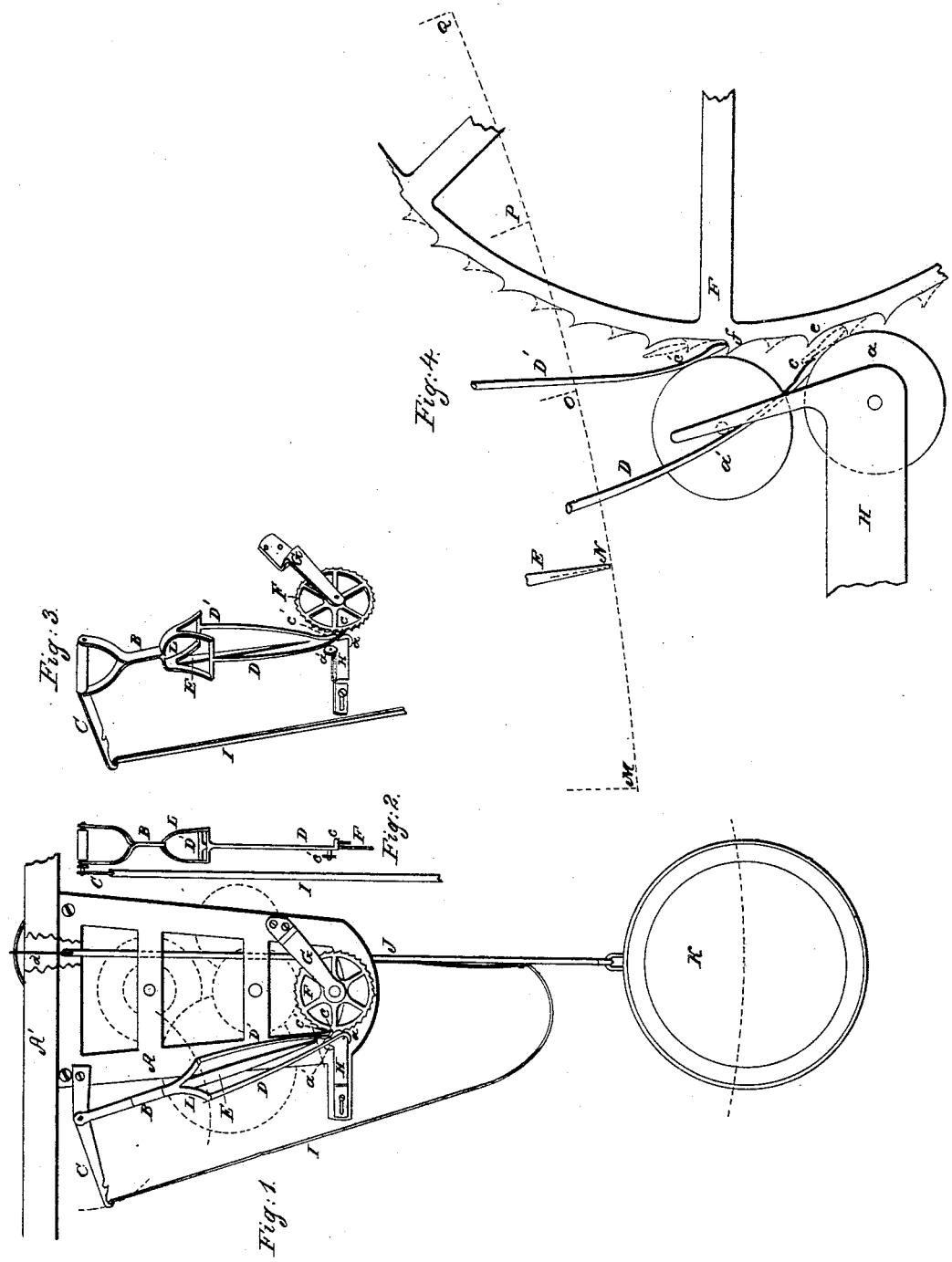
Witnesses:
L. C. Champney
Anson Whitney
Inventor:
Henry C. Fay

UNITED STATES PATENT OFFICE.

HENRY C. FAY, OF TROY, NEW YORK.

TIMEKEEPER.

Specification of Letters Patent No. 20,201, dated May 11, 1858.

*To all whom it may concern:*

Be it known that I, HENRY C. FAY, of Troy, in the county of Rensselaer and the State of New York, have invented a new and useful Improvement in the Escapement of Clocks, Watches, and other Timepieces; and I do hereby declare that the following is a full, clear, and exact description of the construction and operation of the same, reference being had to the annexed drawings, making part of this specification, in which—

Figure 1 is a front elevation; Fig. 2 a transverse section; Fig. 3 is a section in perspective; Fig. 4 a section of the front elevation enlarged tenfold.

Letters of reference are the same in each.

A is the front plate of the clock frame; B C D D' E compose the verge, of which B is the working beam, C the arm or lever, D D' pallet arms or connectors reaching to the driving side of the escape wheel F; and on their ends are two pallets or detents $c$ $c'$; and E index for plumbing the clock in beat. G is a cap projecting from the front plate for holding the front pivot of the escape wheel so as to allow the wheel to project in front of said plate; H is a cap with two prongs for holding the friction rollers $a$ $a'$; I is a connector for connecting the verge to the pendulum; J is the pendulum-rod suspended to the top of the case by the spring $d$; K is the pendulum ball; A' is part of the case and M N O P Q the arc described by the index E.

Fig. 1 represents the pendulum at rest in the center of oscillation with index E pointing to the tangent of the escape wheel between the pallets $c$ $c'$. But Fig. 4 represents the pendulum as having swung to the left enough to bring the index E to the point N in the arc M N O P Q which is at the point where the pallet $c'$ touches the tooth $f$ and the pallet $c$ drops from the tooth $e$ and then the impetus given the pendulum by the pressure that has been upon the pallet $c$ by the tooth $e$ will carry the index E to the point M (or somewhere between according to the amount of motive power by which the clock is propelled) where the motive force of the clock has no power over the pendulum because the axis of the pallet $c'$ is in a direct line between the axis of the working beam and the tooth $f$. Then in returning, at O (the zero point) the pendulum would be in the center of oscillation and the position of the parts would be as represented in Fig. 1. But when it arrives at the point P the escape wheel will have made one escape and the position of the teeth and pallets will be as represented by the red dotted lines, the lower pallet receiving and detaining the tooth and the upper one just escaping from the pressure of tooth $f$ by which the pendulum has received another impetus to send the index toward the point Q when the axis of the lower pallet will be brought in the line to form a dead center. And when the index returns again to O the position of the parts will be as in Fig. 3 with the upper pallet free of the wheel. Now while the index is passing from N to P (the angle of escapement where the pendulum receives all its impetus) although the escape wheel has a forward movement from the black to the red lines an angle of 5° 37' 30" yet while in the supplementary angles from M to N and from P to Q it recoils but few minutes of a degree; and when the clock is propelled by weight or something that gives an even force the recoil can be made still less if desired, by making the axes of the pallets nearer together.

In connecting the verge to the pendulum I ascertain as near as may be the center of motion in the pendulum spring $d$, Fig. 1 and from thence in a straight line through the axis of the working beam B to any point in the lever C (according to the amount of motion I wish to give the pendulum) I attach a connector by some free joint running it in a tangent of their common radii or lines of those two centers of motion, to the lower end of the pendulum rod or (if the rod is not long enough to meet it) to a bracket coming out from the pendulum into the tangent, to which I attach it by a spring that has a slight pressure outward to prevent any riggle where it joins the lever C; or it may be made flexible the whole length so as to allow it to move in the arc of the lever C instead of from the center of motion of the pendulum as it would be inclined to do if it was inflexible.

The nature of my invention consists (as shown above) in using for what is termed the verge in the common escapement, a working beam whose axis is at one end, and at the other end are attached two connectors reaching to a tangent of the escape wheel the ends forming pallets or detents for the same; the axes of said connectors to be so few degrees apart that as the beam is worked from side to side each axis is brought on a line with the axis of the working beam and its own detent upon the wheel (this may be done on either side of the wheel; but if it is done upon the leading side the axis of the working beam must occupy the middle position and consequently the connectors or pallet arms must be considerably longer and the pallets or detents at the ends must catch the teeth on their upper or leading side). There is no precise length for these arms except the lower one must be three escapes or one and a half teeth longer than the upper one, thereby forming two knee-joints that pass on and off their dead centers in such a manner as to completely remove the motive force of the timepiece from the pendulum or balance at the extremes of oscilaltion. And that too without the escape wheel tooth being obliged to slide on a long level surface that must be kept well oiled, as is the case in the common dead-beat clock. And by this arrangement there is no drop to the tooth of the escape wheel because before either leaves the tooth it detains the other pallet has received and detained another tooth of the same wheel, which prevents that snapping of the teeth called ticking. The only ticking in this arrangement being the falling of the pallets upon the guides or friction rollers after they have left the tooth. This drop of the tooth as it is termed (which by this arrangement is prevented) not only is a great loss of power but tends more or less to disturb the isochronism of the oscillating body.

The pinwheel as it is termed, i.e., an escape wheel with pins projecting from the disk instead of teeth on the periphery may be used by making the pallets or detents with a hollow somewhat like the present teeth to take in the pins. In that case the difference in the length of the pallet-arms need not be but one escape or half the distance from one pin to another; as both pallets could play upon the same pin at the same time.

The nature of the invention also consists in connecting the verge and pendulum by joining to the verge in the line of their centers a connector running tangent or perpendicular to said line and attaching it to the pendulum by a spring to allow it to accommodate itself to the difference of the two arcs. This may be done between the two centers if preferred. The advantages of this connection are: getting any required difference of motion between the verge and pendulum with the least possible amount of friction; and preventing that gyrating or wabbling of the pendulum without the necessity of a double spring at the top. But the great advantage of the combination is; that I am enabled to run clocks entirely without oil which prevents that variation there will be even with the best clocks that run with oil; when they are first put in order, and when the oil becomes thick and viscid.

I disclaim the invention of a jointed verge or one with movable detents as that has been used by John Harrison and others. (*Vide* "Reid on clock and watch making," page 205). But What I do claim and desire to secure by Letters Patent, is—

The invention of a verge with movable detents so constructed that in the vibrations of the pendulum or balance, each detent will be carried on, nearly on or past its dead center so as to greatly lessen the recoil of the movement.

HENRY C. FAY.

Witnesses:
L. C. CHAMPNEY,
AARON WHITCOMBE.